US012624142B2

(12) United States Patent
Koike et al.

(10) Patent No.: US 12,624,142 B2
(45) Date of Patent: May 12, 2026

(54) OPTICAL POLYMER MATERIAL, OPTICAL FILM, DISPLAY DEVICE, OPTICAL POLYMER MATERIAL MANUFACTURING METHOD, AND OPTICAL FILM MANUFACTURING METHOD

(71) Applicants: Yasuhiro KOIKE, Yokohama (JP); TOSOH CORPORATION, Yamaguchi-ken (JP)

(72) Inventors: Yasuhiro Koike, Kanagawa (JP); Yuma Kobayashi, Tokyo (JP); Kohei Watanabe, Fukuoka (JP)

(73) Assignees: Yasuhiro Koike, Yokohama (JP); TOSOH CORPORATION, Yamaguchi-ken (JP)

(*) Notice: Subject to any disclaimer, the term of this patent is extended or adjusted under 35 U.S.C. 154(b) by 745 days.

(21) Appl. No.: 17/789,155

(22) PCT Filed: Dec. 24, 2020

(86) PCT No.: PCT/JP2020/048579
§ 371 (c)(1),
(2) Date: Jun. 24, 2022

(87) PCT Pub. No.: WO2021/132519
PCT Pub. Date: Jul. 1, 2021

(65) Prior Publication Data
US 2023/0065322 A1 Mar. 2, 2023

(30) Foreign Application Priority Data
Dec. 26, 2019 (JP) ................................ 2019-237326

(51) Int. Cl.
*C08F 222/40* (2006.01)
*C08F 220/14* (2006.01)
(Continued)

(52) U.S. Cl.
CPC ........ *C08F 222/402* (2020.02); *C08F 220/14* (2013.01); *C08J 5/18* (2013.01);
(Continued)

(58) Field of Classification Search
CPC ................ C08F 222/402; C08F 220/14; C08F 2800/10; C08F 2800/20; C08F 2810/00;
(Continued)

(56) References Cited

U.S. PATENT DOCUMENTS 4,568,722 A * 2/1986 Dean ...................... C08L 25/08
525/73
4,918,152 A * 4/1990 Moritani ............... G02B 1/041
526/262
(Continued)

FOREIGN PATENT DOCUMENTS

CN 105026445 A 11/2015
EP 1 930 750 A1 6/2008
(Continued)

OTHER PUBLICATIONS

JP2009179731A English translation (Year: 2009).*
(Continued)

*Primary Examiner* — Alicia Bland
(74) *Attorney, Agent, or Firm* — Oblon, McClelland, Maier & Neustadt, L.L.P.

(57) ABSTRACT

An optical polymer material includes an alternating copolymer made of a monomer of a styrene derivative and a monomer of a maleimide derivative, and has a nonlinear property in which the photoelastic coefficient of the optical polymer material decreases to a predetermined value with increase in composition ratio of the styrene derivative, and rises above the predetermined value with further increase in composition ratio of the styrene derivative. A composition ratio of the styrene derivative is within a predetermined
(Continued)

range. An absolute value of the photoelastic coefficient is equal to or smaller than a first absolute value within the predetermined range of the composition ratio, and an absolute value of the intrinsic birefringence is equal to or smaller than a second absolute value of the optical polymer material within the predetermined range of the composition ratio.

11 Claims, 8 Drawing Sheets

(51) Int. Cl.

| | |
|---|---|
| ***C08J 5/18*** | (2006.01) |
| ***C08L 33/12*** | (2006.01) |
| ***C08L 35/00*** | (2006.01) |
| ***G02B 1/08*** | (2006.01) |

(52) U.S. Cl.

CPC ............... *C08L 33/12* (2013.01); *C08L 35/00* (2013.01); *G02B 1/08* (2013.01); *C08F 2800/10* (2013.01); *C08F 2800/20* (2013.01); *C08F 2810/00* (2013.01); *C08J 2333/12* (2013.01); *C08J 2335/00* (2013.01); *C08J 2435/00* (2013.01); *C08L 2203/16* (2013.01); *C08L 2205/025* (2013.01)

(58) Field of Classification Search

CPC .... C08F 212/08; C08F 222/40; C08F 220/22; C08J 5/18; C08J 2333/12; C08J 2335/00; C08J 2435/00; C08J 2335/06; C08L 33/12; C08L 35/00; C08L 2203/16; C08L 2205/025; C08L 35/06; G02B 1/08; G02B 5/30; B29D 11/00

See application file for complete search history.

(56) References Cited

U.S. PATENT DOCUMENTS

| | | | | |
|---|---|---|---|---|
| 5,077,343 | A * | 12/1991 | Newman | C08F 212/04<br>525/293 |
| 2009/0257012 | A1* | 10/2009 | Sabae | G02F 1/133634<br>359/489.07 |
| 2014/0128547 | A1 | 5/2014 | Yonemura et al. | |
| 2015/0232620 | A1 | 8/2015 | Sakane | |
| 2017/0037236 | A1 | 2/2017 | Yonemura et al. | |
| 2018/0312682 | A1 | 11/2018 | Yonemura et al. | |

FOREIGN PATENT DOCUMENTS

| | | | |
|---|---|---|---|
| JP | 61-028540 | A | 2/1986 |
| JP | 61-21 8607 | A | 9/1986 |
| JP | 64-079208 | A | 3/1989 |
| JP | 6-242301 | A | 9/1994 |
| JP | 2008-094912 | A | 4/2008 |
| JP | 2008-242349 | A | 10/2008 |
| JP | 2009179731 | A * | 8/2009 |
| JP | 2011-048025 | A | 3/2011 |
| JP | 2012-203328 | A | 10/2012 |
| JP | 2015-197483 | A | 11/2015 |
| JP | 6114459 | B1 | 4/2017 |
| WO | WO 2009/031544 | A1 | 3/2009 |
| WO | WO-2013/005634 | A1 | 1/2013 |
| WO | WO 2014/061648 | A1 | 4/2014 |

OTHER PUBLICATIONS

International Search Report issued Mar. 16, 2021 in PCT/JP2020/048579 filed on Dec. 24, 2020, 3 pages.

Shikanai et al., "Temperature-independent zero-birefringence polymer for liquid crystal displays", Applied Physics Letters, vol. 108, 131902, 2016, 5 pages.

Combined Chinese Office Action and Search Report issued May 23, 2024 in Chinese Application 202080087577.4, (with unedited computer-generated English translation), 32 pages.

Extended European Search Report issued Dec. 19, 2023 in European Patent Application No. 20906823.8.

Chang, J. et al., "N-phenylmaleimide polymers for second-order nonlinear optics," Polymer, vol. 38, No. 18, 1997, XP004085687, 6 pages.

Nishimore, K. et al., "Design of Maleimide Monomer for Higher Level of Alternating Sequence in Radical Copolymerization with Styrene," Journal of Polymer Science, Part A: Polymer Chemistry, vol. 57, 2019, XP093110372, 9 pages.

Japanese Office Action Issued Jul. 1, 2025 in Japanese Patent Application No. 2024-109850 (with unedited computer-generated English translation), 8 pages.

Japanese Office Action Issued Jul. 1, 2025 in Japanese Patent Application No. 2024-109849 (with unedited computer-generated English translation), 10 pages.

Japanese Office Action issued Jun. 24, 2025 in Japanese Patent Application No. 2024-109848 (with unedited computer-generated English translation), 9 pages.

* cited by examiner

OPTICAL POLYMER MATERIAL, OPTICAL FILM, DISPLAY DEVICE, OPTICAL POLYMER MATERIAL MANUFACTURING METHOD, AND OPTICAL FILM MANUFACTURING METHOD

CROSS-REFERENCE TO RELATED APPLICATIONS

The present application is a 35 U.S.C. § 371 national stage application of International patent application PCT/JP2020/048579, filed Dec. 24, 2020, which is based on and claims the benefit of priority to Japanese Application 2019-237326, filed Dec. 26, 2019. The entire contents of these applications are incorporated herein by reference.

FIELD

The present invention relates to an optical polymer material, an optical film, a display device, a method for manufacturing the optical polymer material, and a method for manufacturing the optical film.

BACKGROUND

In recent years, display devices including, as typical examples, liquid crystal display devices (LCDs) and organic light-emitting diode (OLED) display devices have been used as display devices for various devices. For example, these display devices are used in computer display devices, TV receivers, instrument panels and navigation devices in automobiles, airplanes, ships, and the like, mobile information terminals such as smartphones, or digital signage (electronic signage) used for advertisements and guidance displays.

Several types of optical polymer films are used in these display devices to contribute to excellent image quality. Among them, a polarizer protection film, for example, is required such that birefringence thereof is reduced to a very low level. Low birefringence is also required in polymers used for pickup lenses and LCD backlights. To reduce the birefringence to a low level, it is preferable that intrinsic birefringence and photoelastic birefringence be low. In consideration of use under a wide range of environmental temperatures, it is preferable that the temperature dependence of the intrinsic birefringence be low (e.g., Non Patent Literature 1). In order to produce such an optical polymer material having low temperature dependence and low birefringence, quaternary and quintet optical polymer materials have been conventionally required.

CITATION LIST

Non Patent Literature

Non Patent Literature 1: M. D. Shikanai, A. Tagaya, and Y. Koike, Appl. Phys. Lett. 108 pp. 131902 (2016).

SUMMARY

Technical Problem

However, the quintet optical polymer material has a practical problem because of its complex composition and complicated design to obtain desired properties.

In view of this, the present invention has been made, and it is an object thereof to provide an optical polymer material and an optical film that have a simple composition and low birefringence and can be easily designed to obtain desired properties, methods for manufacturing them, and display devices using them.

Solution to Problem

To solve the problem described above and to achieve the object, an optical polymer material according to one aspect of the present invention includes an alternating copolymer made of a monomer of a styrene derivative and a monomer of a maleimide derivative. The optical polymer material has a nonlinear property in which a photoelastic coefficient of the optical polymer material decreases to a first value with an increase in composition ratio of the styrene derivative, and rises above the first value with a further increase in composition ratio of the styrene derivative, and a composition ratio of the styrene derivative is within a predetermined range, an absolute value of the photoelastic coefficient is equal to or smaller than a first absolute value within the predetermined range of the composition ratio, and an absolute value of an intrinsic birefringence of the optical polymer material is equal to or smaller than a second absolute value within the predetermined range of the composition ratio.

An optical polymer material according to one aspect of the present invention includes a polymer made of a monomer of a styrene derivative, a monomer of a maleimide derivative, and a monomer of a modified organic compound having a physical property related to mechanical strength, the physical property being different from those of the monomer of the styrene derivative and the monomer of the maleimide derivative. The optical polymer material has a nonlinear property in which, in relation to the monomer of the styrene derivative and the monomer of the maleimide derivative, a photoelastic coefficient of the optical polymer material decreases to a second value with an increase in composition ratio of the styrene derivative, and rises above the second value with a further increase in composition ratio of the styrene derivative, and a composition ratio of the styrene derivative is within a predetermined range, an absolute value of the photoelastic coefficient is equal to or smaller than a third absolute value within the predetermined range of the composition ratio, and an absolute value of an intrinsic birefringence of the optical polymer material is equal to or smaller than a fourth absolute value within the predetermined range of the composition ratio.

An optical film according to one aspect of the present invention includes the optical polymer material.

A display device according to one aspect of the present invention includes the optical film.

An optical polymer material manufacturing method according to one aspect of the present invention includes a step of forming an optical polymer material containing an alternating copolymer made of a monomer of a styrene derivative and a monomer of a maleimide derivative. A composition ratio of the styrene derivative is set within a predetermined range, and the optical polymer material having an absolute value of a photoelastic coefficient being equal to or smaller than a first absolute value within the predetermined range of the composition ratio and having an absolute value of an intrinsic birefringence being equal to or smaller than a second absolute value within the predetermined range of the composition ratio is formed.

An optical polymer material manufacturing method according to one aspect of the present invention includes a step of forming an optical polymer material containing a polymer made of a monomer of a styrene derivative, a monomer of a maleimide derivative, and a monomer of a modified organic compound having a physical property related to mechanical strength, the physical property being different from those of the monomer of the styrene derivative and the monomer of the maleimide derivative. A composition ratio of the styrene derivative is set within a predetermined range, and the optical polymer material having an absolute value of a photoelastic coefficient being equal to or smaller than a third absolute value within the predetermined range of the composition ratio and having an absolute value of an intrinsic birefringence being equal to or smaller than a fourth absolute value within the predetermined range of the composition ratio is formed.

An optical film manufacturing method according to one aspect of the present invention includes thinly forming an optical polymer material manufactured by the optical polymer manufacturing method to produce an optical film.

Advantageous Effects of Invention

According to the present invention, it is possible to produce the optical polymer material and the optical film that have a simple composition such as a binary or ternary composition and ease of design and also have an extremely desirable low birefringence property.

DESCRIPTION OF EMBODIMENTS

Embodiments of the present invention will now be described in detail with reference to the drawings. The present invention is not limited to these embodiments. In each drawing, like or equivalent elements are designated by like reference signs as appropriate. It should be noted that the drawings are schematic and the relationship between the dimensions of each element may be different from those of the actual one. The drawings may also contain parts dimensional relationships and proportions of which are different between the respective drawings.

Figure 1:
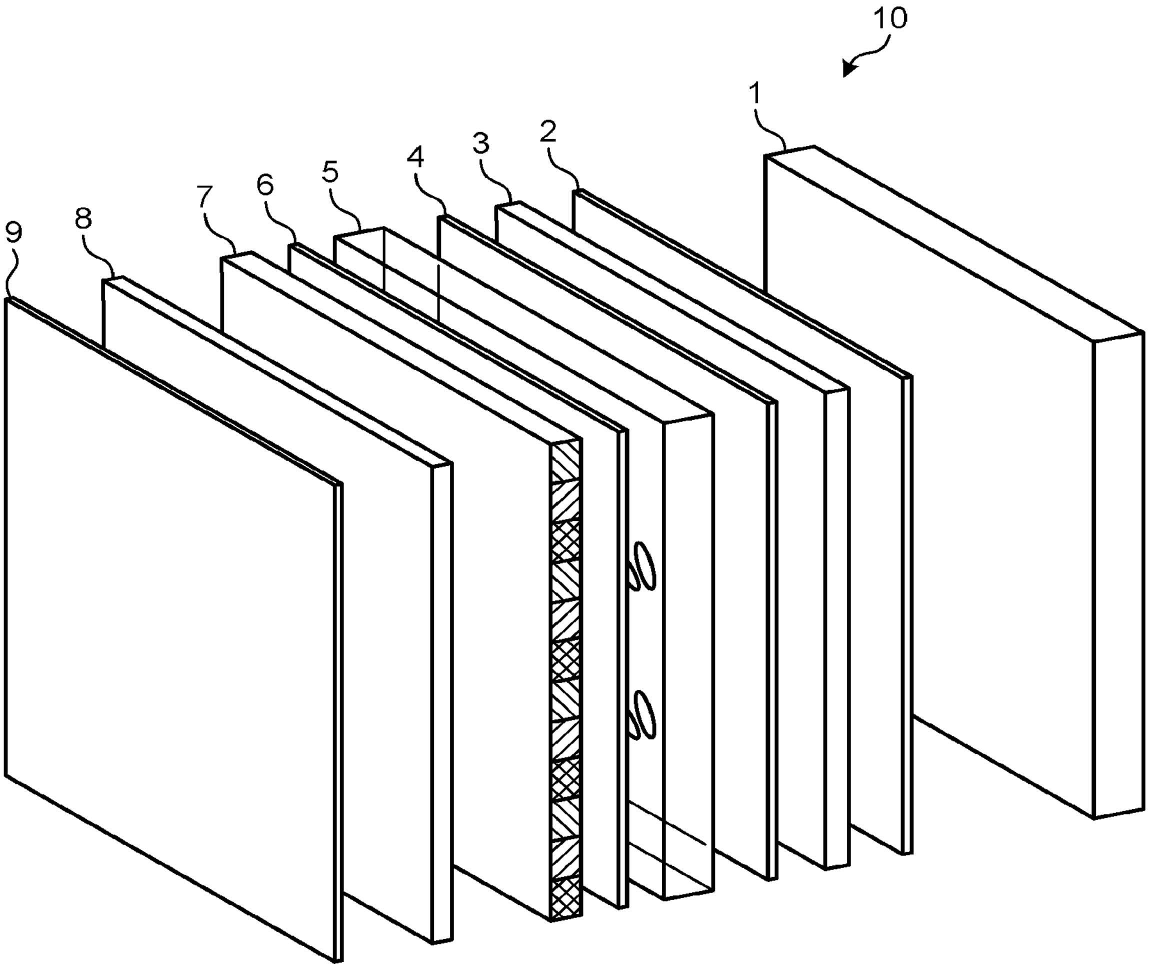
FIG. 1 is a schematic exploded perspective view of a main part of a liquid crystal display device using an optical film made of an optical polymer material according to an embodiment.

Optical polymer materials according to the embodiments of the present invention are used, for example, as materials for optical films in liquid crystal display devices. FIG. 1 is a schematic exploded perspective view of a main part of a liquid crystal display device using an optical film made of an optical polymer material according to an embodiment thereof. This liquid crystal display device 10 has a known configuration in which a backlight 1, a polarizer 2, a phase-difference film 3, a glass substrate 4 with a transparent electrode, a liquid crystal layer 5, a glass substrate 6 with a transparent electrode, a RGB color filter 7, a phase-difference film 8, and a polarizer 9, are stacked in this order.

In this liquid crystal display device 10, the optical film made of the optical polymer material according to the embodiment can be suitably used as the phase-difference films 3, 8 and protective films stuck on both sides of each polarizing plate 2, 9.

The optical polymer material according to the embodiment of the present invention contains an alternating copolymer made of a monomer of a styrene derivative and a monomer of a maleimide derivative. According to studies diligently conducted by the inventors of the present invention, the optical polymer material containing the alternating copolymer made of the monomer of a styrene derivative and the monomer of a maleimide derivative has a birefringence property that changes nonlinearly depending on the composition ratio of the styrene derivative contained therein. This nonlinear change in birefringence property is a nonlinear property in which the photoelastic coefficient decreases to a predetermined value as the composition ratio of the styrene derivative increases, and then rises above the predetermined value as the composition ratio of the styrene derivative further increases.

In view of this, taking advantage of this nonlinearity, the inventors have found an optical polymer material that has an extremely desirable low birefringence property while having a simple binary composition and ease of design. Specifically, the inventors have found that it is possible to achieve such properties that the composition ratio of the styrene derivative is within a predetermined range, the absolute value of the photoelastic coefficient is relatively small to be equal to or smaller than a first value within this predetermined range of the composition ratio, and the absolute value of the intrinsic birefringence is relatively small to be equal to or smaller than a second value within the predetermined range of the composition ratio.

Optical films used in display devices such as liquid crystal display devices and optical equipment are generally subjected to stress during use, which causes photoelastic birefringence (also called stress birefringence). Because the photoelastic birefringence is proportional to the photoelastic coefficient and the stress, the photoelastic birefringence decreases as the photoelastic coefficient decreases. Thus, if the absolute values of the photoelastic coefficient and the intrinsic birefringence are small, extremely desirable low birefringence properties can be achieved. Herein, the photoelastic coefficient and the intrinsic birefringence are quantities intrinsic to a substance.

A first absolute value that is the upper limit of the photoelastic coefficient is sufficiently small when it is $50\times10^{-12}$ $Pa^{-1}$, for example, but it is preferably $10\times10^{-}Pa^{-1}$, and more preferably $2\times10^{-12}$ $Pa^{-1}$. A second absolute value that is the upper limit of the intrinsic birefringence is sufficiently small when it is $20\times10^{-3}$, for example, but it is preferably $5\times10^{-3}$, and more preferably $1\times10^{-3}$.

When the absolute value of the temperature coefficient of the intrinsic birefringence is $2\times10^{-5}$° $C.^{-1}$ or less, more preferably $1\times10^{-5}$° $C.^{-1}$ or less, the temperature dependence of birefringence is small, and thus suitable birefringence properties can be maintained under a wide range of environmental temperatures.

In an optical polymer material including a random polymer, the intrinsic birefringence, the photoelastic coefficient, and the temperature coefficient of the intrinsic birefringence generally change linearly with the composition ratio of a monomer therein. However, in the optical polymer material according to the embodiment of the present invention, the birefringence property changes nonlinearly with the composition ratio of the styrene derivative. Thus, it is considered that a preferable birefringent property can be achieved with a simple binary composition and ease of design.

Furthermore, the inventors have also found that the optical polymer material according to the embodiment of the present invention is much more excellent in flexibility and heat resistance than existing optical polymer materials having low birefringence.

Here, maleimide has a basic structure of a five-membered ring in which maleic acid is imidized, and the hydrogen atom bonded to the nitrogen atom thereof is replaced with various substituents to form various maleimide derivatives. Styrene has a basic structure in which one hydrogen atom of benzene is replaced with a vinyl group, and the hydrogen atom is replaced with various substituents to form various styrene derivatives.

The structural formula of N-ethylmaleimide is given below. The molecular weight of N-ethylmaleimide is 125.13.

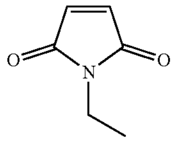

The structural formula of styrene is given below. The molecular weight of styrene is 104.15.

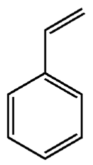

Furthermore, an example of the structural formula of an alternating copolymer made of N-ethylmaleimide and styrene is given below.

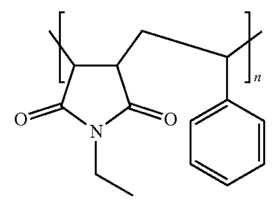

Each maleimide derivative is represented, for example, by general formula:

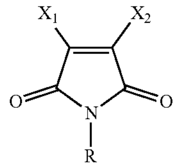

(R is selected from hydrogen, methyl group, ethyl group, propyl group, isopropyl group, butyl group, tert-butyl group, 1-methylpropyl group, 2-methylpropyl group, pentyl group, cyclopentyl group, 1,1-dimethylpropyl group, 1,2-dimethylpropyl group, 2,2-dimethylpropyl group, 1-ethylpropyl group, 2-ethylpropyl group, 1-methylbutyl group, 2-methylbutyl group, 3-methylbutyl group, hexyl group, cyclohexyl group, 1-methylpentyl group, 2-methylpentyl group, 3-methylpentyl group, 4-methylpentyl group, 1-ethylbutyl group, 2-ethylbutyl group, 1,1-dimethylbutyl group, 1,2-dimethylbutyl group, 1,3-dimethylbutyl group, 2,2-dimethylbutyl group, 2,3-dimethylbutyl group, 1,1,2-trimethylpropyl group, 1,2,2-trimethylpropyl group, 1-methyl-1-ethylpropyl group, 1-ethyl-2-methylpropyl group, 1,1-diethylethyl group, 2-ethylhexyl group, dodecyl group, lauryl group, hydroxymethyl group, 2-hydroxyethyl group, chloromethyl group, dichloromethyl group, trichloromethyl group, fluoromethyl group, difluoromethyl group, trifluoromethyl group, chlorofluoromethyl group, dichlorofluoromethyl group, bromomethyl group, iodomethyl group, 1-chloroethyl group, 2-chloroethyl group, 2,2,2-trichloroethyl group, 1,1,2,2,2-pentachloroethyl group, 1-fluoroethyl group, 2-fluoroethyl group, 2,2,2-trifluoromethyl group, 1,1,2,2,2-pentafluoroethyl group, 2-bromoethyl group, and 2,2,2-tribromoethyl group, for example. $X_1$ and $X_2$ may be the same or different, and are each selected from hydrogen, fluorine, chlorine, bromine, iodine, hydroxy group, and methyl group, for example. However, R, $X_1$, and $X_2$ are not limited to these. For example, R may be a phenyl group or a benzyl group.)

Each styrene derivative is represented, for example, by general formula:

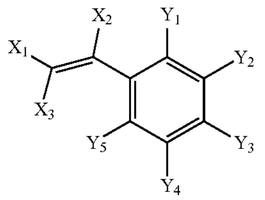

($X_1$ to $X_3$ may be the same or different, and are selected from hydrogen, fluorine, chlorine, bromine, iodine, hydroxy group, and methyl group, for example. $Y_1$ to $Y_5$ may be the same or different, and are selected from hydrogen, fluorine, chlorine, bromine, iodine, hydroxy group, methyl group, hydroxymethyl group, ethyl group, propyl group, isopropyl group, butyl group, tert-butyl group, pentyl group, and hexyl group, for example. However, $X_1$ to $X_3$ and $Y_1$ to $Y_5$ are not limited to these.)

The maleimide derivative and the styrene derivative given in these general formulas have structures that correspond to monomers when viewed in terms of monomer units that finally form a polymer in the optical polymer material according to the embodiment of the present invention.

In polymerization reaction between the maleimide derivative and the styrene derivative, the monomer reactivity ratios $r_1$, $r_2$ are extremely low, and an alternating copolymer tends to be easily formed.

Hereinafter, the alternating copolymer made of a monomer of the styrene derivative and a monomer of the maleimide derivative may be referred to as St/XMI-based polymer or P(St/XMI). For example, when the maleimide derivative is N-ethylmaleimide, the XMI is referred to as EMI. For N-methylmaleimide, it is referred to as MeMI. For N-cyclohexylmaleimide, it is referred to as CHMI. For N-tert-butylmaleimide, it is referred to as tBuMI. Hereinafter, St is styrene represented by the chemical formula $C_6H_5CH{=}CH_2$ unless otherwise mentioned.

(Preparation of Samples)

Samples were prepared to confirm the properties of the optical polymer material according to the embodiment of the present invention. Examples of a method of synthesizing the alternating copolymer made of the styrene derivative and the maleimide derivative include a method in which a material for forming the maleimide derivative and a material for forming the styrene derivative are alternately copolymerized and then side chains thereof are caused to react, whereby the alternating copolymers made of the maleimide derivative and the styrene derivative are synthesized. The material for forming the maleimide derivative is a material that, after being incorporated into the alternating copolymer, can form a maleimide derivative by side chain reaction, for example, when viewed in terms of monomer unit. Similarly, the material for forming the styrene derivative is a material that, after being incorporated into the alternating copolymer, can form a styrene derivative by side chain reaction, for example, when viewed in terms of monomer unit. Examples of the material for forming the maleimide derivative include a maleic anhydride derivative and a maleic acid derivative. The alternating copolymer synthesized in this manner may be caused to react with any side chain to prepare a polymer having a desired structure.

Here, XMI and St were used to prepare alternating copolymers. To begin with, St, EMI, MeMI, tBuMI, and CHMI manufactured by Tokyo Chemical Industry Co., Ltd. were prepared as reagents. St was purified by reduced-pressure distillation. Methanol and methylene chloride manufactured by Wako Pure Chemical Industries, Ltd. were also prepared as solvents.

Polymerization was then performed by the following steps.

1. XMI (EMI, MeMI, tBuMI, or CHMI) and a St monomer, a polymerization initiator, and a chain transfer agent were put into test tubes and blended. The blending ratio of XMI to St was set to various values. For example, 100% of the monomer to be put in was set to XMI, or 100% thereof was set to St.
2. After sealing each test tube, the contents therein were mixed by shaking sufficiently, and then ultrasonically deaerated and dispersed.
3. The polymerization was performed by allowing the test tube to stand in a hot water bath at 70° C. for 24 hours.

A bulk obtained by cutting off both ends of a cylindrical bulk of each optical polymer material prepared by the above-described steps was further purified by the following steps.

1. The bulk was crushed into about 1 cm squares, and was put into methylene chloride to prepare a homogeneous polymer solution.
2. The polymer solution was dropped into methanol to precipitate the polymer.
3. Filtration was performed with a filter paper, the polymer remaining on the filter paper was collected and dried under reduced pressure in a desiccator for 2 to 3 hours, and then further dried at 105° C. under reduced pressure for 24 hours or more in a reduced-pressure dryer.

The glass transition temperature of the purified polymer obtained by the above-described steps was measured with a differential scanning calorimeter, DSC-60 (DSC) manufactured by Shimadzu Corporation.

Furthermore, the purified polymer was formed into a thin film by the following steps.

1. 8 to 20 g of methylene chloride was added to 1 to 2 g of the purified polymer to prepare a homogeneous polymer solution.
2. The polymer solution was spread on a peeling PET film with an applicator in a draft.
3. The spread polymer solution was covered with a lid, and the solvents were slowly evaporated.
4. The polymer film formed on the peeling PET film was peeled off, and was dried under reduced pressure for 24 hours or more in the reduced-pressure dryer. Polymer films having glass transition temperatures of 125° C. or less were dried at 90° C. under reduced pressure, and the other polymer films were dried at 105° C. under reduced pressure.

The photoelastic coefficient of each prepared polymer film was measured with an automatic birefringence control system ABR-EX manufactured by Uniopt Co., Ltd. The measurement of the photoelastic coefficient was performed as follows. To begin with, retardation was measured by applying a stress of 0 to 2 N at intervals of about 0.1 N to each sample film having a width of 4 to 5 mm and a thickness of about 35 to 55 μm as a film measurement area. Subsequently, the photoelastic coefficient was calculated from the retardation and the width of the measurement area in the range of about 0.3 to 2 N. Thus, the maximum stress to be applied when the photoelastic coefficient is measured is about 2 N.

Subsequently, each prepared polymer film was uniaxially thermally stretched with IMC-C513 that is a film biaxial stretching device manufactured by Imoto machinery Co., Ltd. This stretched film was then allowed to stand for 24 hours or more to reduce the internal stress, and the degree of orientation thereof was evaluated by an infrared dichroism method on the basis of absorbance in the infrared region measured with a Fourier transform infrared spectrophotometer Varian 7000e manufactured by Varian, Inc. The retardation of the stretched film was measured with an automatic birefringence control system ABR-10A manufactured by Uniopt Co., Ltd. The intrinsic birefringence was then calculated from the retardation, the degree of orientation, and the film thickness. For some of the polymer films, the refractive index was measured to estimate the copolymerization composition ratio.

When the film thickness is d, the retardation is Re, the orientation birefringence is $\Delta n_{or}$, the intrinsic birefringence is $\Delta n^0$, and the degree of orientation is f, the following relationship holds.

$$Re=\Delta n_{or}\cdot d=\Delta n^0\cdot f\cdot d$$

Thus, the intrinsic birefringence can be calculated from the retardation, the orientation, and the film thickness.

Examples of measurement results are given in Table 1. The intrinsic birefringence calculated from the measurement results can be defined by weighting the intrinsic birefringence of each composition polymer with the weight fraction of the composition polymer, and calculating the average of the weighted intrinsic birefringences of all polymers.

TABLE 1

| Temperature (° C.) | Retardation (nm) | Thickness (μm) | Degree of Orientation | Orientation Birefringence ($10^{-3}$) | Intrinsic Birefringence ($10^{-3}$) |
|---|---|---|---|---|---|
| 15.1 | 0.0775 | 21.9 | 0.15 | 0.0035 | 0.024 |
| 20.1 | 0.145 | | | 0.0066 | 0.044 |
| 24.9 | 0.24 | | | 0.011 | 0.073 |
| 30.1 | 0.3465 | | | 0.016 | 0.11 |
| 35.1 | 0.466 | | | 0.021 | 0.14 |
| 40.1 | 0.5765 | | | 0.026 | 0.18 |
| 45.1 | 0.695 | | | 0.032 | 0.21 |
| 50.1 | 0.775 | | | 0.035 | 0.24 |
| 55.1 | 0.9645 | | | 0.044 | 0.29 |
| 60.2 | 1.1065 | | | 0.051 | 0.34 |
| 65.0 | 1.2185 | | | 0.055 | 0.37 |
| 69.9 | 1.338 | | | 0.061 | 0.41 |

(Birefringence Properties)

Figure 2:
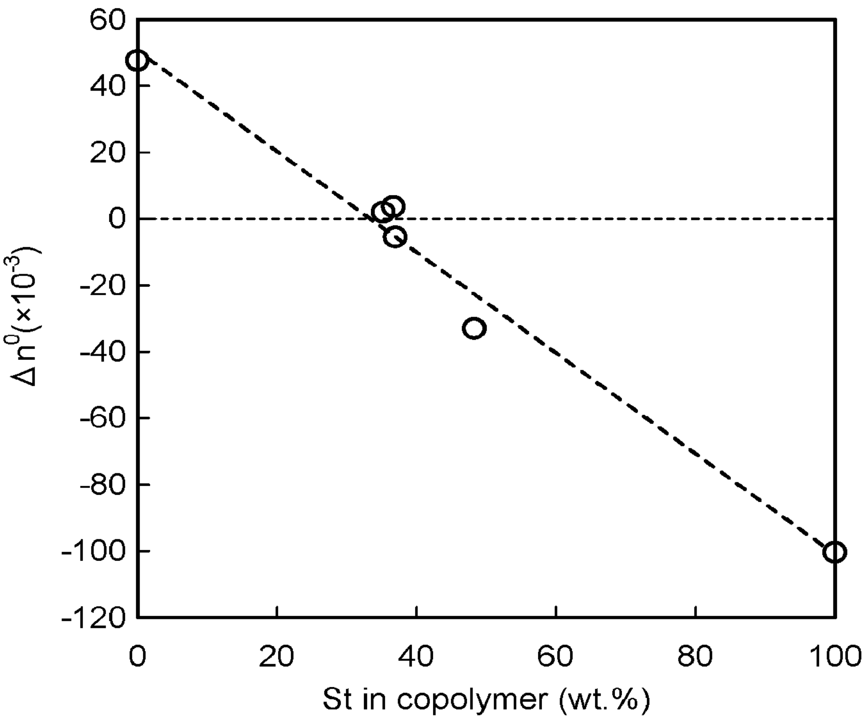
FIG. 2 is a graph illustrating the intrinsic birefringence versus the mass ratio of styrene in an optical polymer film containing P(St/EMI).

The birefringence properties of the optical polymer film prepared as described above will be described. To begin with, the birefringence properties of optical polymer films containing P(St/EMI) prepared by blending more EMI monomers than St monomers are described. FIG. 2 is a graph illustrating the intrinsic birefringence versus the mass ratio of styrene in the optical polymer film at 25° C. The vertical axis represents the intrinsic birefringence $\Delta n^0$. The horizontal axis represents the composition ratio of St in the optical polymer film as a percentage by mass (wt. %). St is considered to be present as an alternating copolymer or a homopolymer in the optical polymer film. The mass ratio means the ratio of the total mass of St constituting the alternating copolymer and the homopolymer to the mass of the optical polymer film. In other words, the data point at a mass ratio of 0% represents data of an optical polymer film made using only EMI without St. The data point at a mass ratio of 100% represents data of an optical polymer film made using only St without XMI. The mass ratio of St is calculated from the refractive index measured at a wavelength of 594 nm, assuming that the refractive index changes linearly with the mass ratio. As illustrated in FIG. 2, it was observed that the intrinsic refractive index changed linearly with the mass ratio of St.

Figure 3:
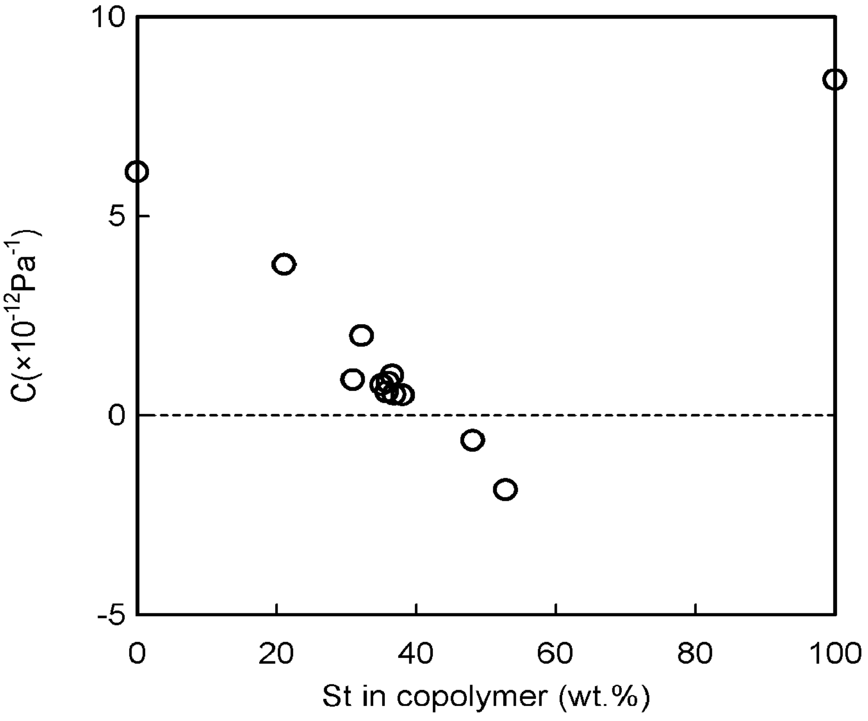
FIG. 3 is a graph illustrating the photoelastic coefficient versus the mass ratio of styrene in the optical polymer containing P(St/EMI).

FIG. 3 is a graph illustrating the photoelastic coefficient versus the mass ratio of styrene in the optical polymer. The horizontal axis represents the composition ratio of St in the optical polymer film as a percentage by mass (wt. %). The vertical axis represents the photoelastic coefficient C. The mass ratio of St is calculated from the refractive index measured at a wavelength of 594 nm, assuming that the refractive index changes linearly with the mass ratio.

As illustrated in FIG. 3, it was observed that the change of the photoelastic coefficient with respect to the mass ratio of St deviated significantly from the linear one. Specifically, it was observed that the photoelastic coefficient changed in such a nonlinear shape that it decreased to $-2\times10^{-12}$ $Pa^{-1}$ as the mass ratio of St increased and it rose above $-2\times10^{-12}$ $Pa^{-1}$ as the composition ratio further increased, i.e., it changed in a downward convex shape or a V-shape. It should be noted that $-2\times10^{-12}$ $Pa^{-1}$ that is a value observed in FIG. 3 does not necessarily correspond exactly to the minimum value of the V-shape.

Figure 4:
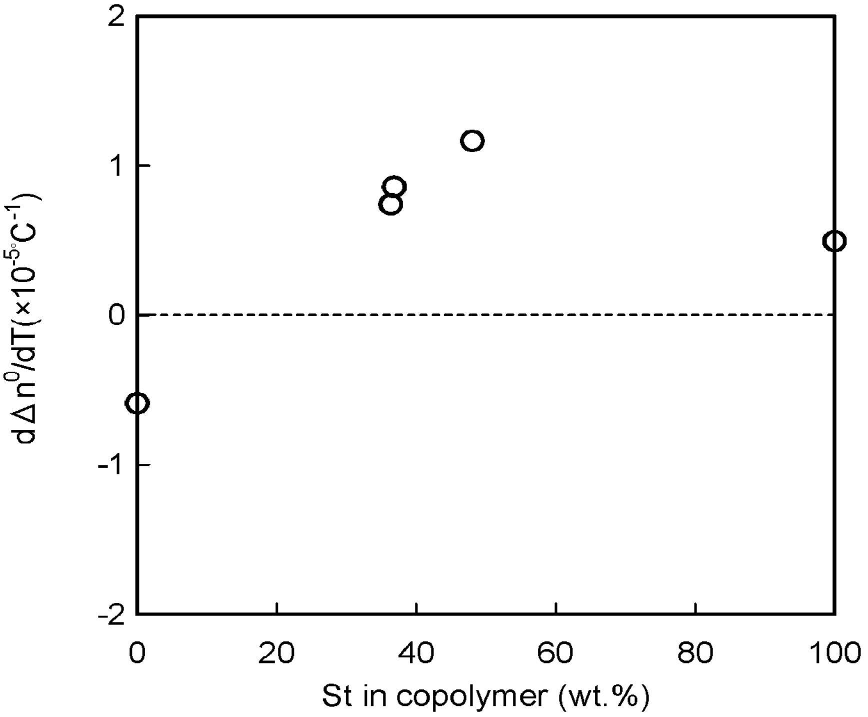
FIG. 4 is a graph illustrating the temperature coefficient of the intrinsic birefringence versus the mass ratio of styrene in the optical polymer film containing P(St/EMI).

FIG. 4 is a graph illustrating the temperature coefficient of the intrinsic birefringence versus the mass ratio of styrene in optical polymer film. The horizontal axis represents the composition ratio of St in the optical polymer film as a percentage by mass (wt. %). The vertical axis represents the temperature coefficient ($d\Delta n^0/dT$) of the intrinsic birefringence. The mass ratio of St is calculated from the refractive index measured at a wavelength of 594 nm, assuming that the refractive index changes linearly with the mass ratio.

As illustrated in FIG. 4, it was observed that the change of the temperature coefficient of the intrinsic birefringence with respect to the mass ratio of St deviated significantly from the linear one. Specifically, it was observed that the temperature coefficient changed in an upward convex shape or the shape of inverted V.

Furthermore, it was observed that, over a range in mass ratio of 0% to 100%, the temperature coefficient was $1.2\times10^{-5}$° $C.^{-1}$ or less, the values of which were extremely small ones satisfying $2\times10^{-5}$° $C.^{-1}$ or less. It should be noted as in FIG. 3 that $1.2\times10^{-5}$° $C.^{-1}$ that is a value observed here does not necessarily correspond exactly to the maximum value of the V-shape, but is certainly a value significantly smaller than $2\times10^{-5}$° $C.^{-1}$.

An example of the properties of the optical polymer material and the optical film prepared is given in Table 2. Tg is a glass transition temperature. St (wt. %) and EMI (wt. %) are mass ratios at the time of blending, i.e., preparation (in feed). As given in Table 2, an extremely high glass transition temperature of 193.9° C. was obtained with St at 23.3 wt. % and EMI at 76.7 wt. %, and thus extremely high heat resistance was confirmed. It was observed that the intrinsic birefringence $\Delta n^0$ was $0.07\times10^{-3}$ at 25° C., the temperature coefficient $d\Delta n^0/dT$ was $0.72\times10^{-5}$° $C.^{-1}$, the photoelastic coefficient C was $0.91\times10^{-12}$ $Pa^{-1}$, all of which were extremely low values close to zero, and thus preferable low birefringence properties were confirmed.

TABLE 2

| St (wt. %) | EMI (wt. %) | Tg (° C.) | $\Delta n^0$ ($\times10^{-3}$) | dΔn0/dT ($\times10^{-5}$° $C.^{-1}$) | C ($\times10^{-12}$ $Pa^{-1}$) |
|---|---|---|---|---|---|
| 23.3 | 76.7 | 193.9 | 0.07 | 0.72 | 0.91 |

Subsequently, the composition ratios (In copolymer) of the sample in Table 2 were measured by proton nuclear magnetic resonance ($^1$H-NMR). They are given in Table 3, together with the composition ratios calculated from the results illustrated in FIG. 2 when $\Delta n^0$ is zero (calculated as $\Delta n^0=0$) and the prepared composition ratios ((in feed)). As given in Table 3, it was confirmed that preferable low birefringence properties can be achieved at P(St/EMI=31/69 (wt. %)). It was also confirmed that such an optical polymer material and such an optical film can be obtained with preparation compositions of St at 23.3 wt. % and EMI at 76.7 wt. %. P(St/EMI=31/69 (wt. %)) corresponds to P(St/EMI=35/65 (mol %)) in terms of mole fraction. The difference between the calculated composition ratio and the actual composition ratio was within 1%. This suggests that, in polymers containing P(St/EMI) (P(St/EMI)-based polymers), an extremely high linearity is established between the intrinsic birefringence and the composition ratio. The optimal composition for reducing birefringence varies depending on the structure of each monomer. For example, the inventors predicted by calculation that, in the P(St/CHMI)-based polymers, the birefringence would be particularly small at compositions around (St/CHMI=16/84 (wt. %)). In other words, it is expected within a predetermined range including (St/CHMI=16/84 (wt. %)) that such preferable properties that the absolute value of the photoelastic coefficient is $50\times10^{-12}$ $Pa^{-1}$ or less and the absolute value of the intrinsic birefringence is $20\times10^{-3}$ or less can be achieved.

TABLE 3

| Ratio | St (wt. %) | EMI (wt. %) |
|---|---|---|
| Calculated as $\Delta n^0 = 0$ | 30.6 | 69.4 |
| In feed | 23.3 | 76.7 |
| In copolymer | 31 | 69 |

(Copolymer Composition Analysis based on Mayo-Lewis Equation)

Subsequently, the copolymer composition of the P(St/EMI)-based polymers was analyzed based on the Mayo-Lewis formula (see, for example, I. Skeist, J. Am. Chem. Soc. 68, p. 1781 (1946), M. Fineman, S. D. Ross, J. Polym. Sci. 5, 2, pp. 259-265 (1949), R. Kitamura, Kobunshi, 14, 160, pp. 564-573 (1965)).

When a monomer $M_1$ and a monomer $M_2$ are St and EMI, respectively, the monomer reactivity ratios $r_1$ and $r_2$ are 0.05 and 0.01. When the monomer $M_1$ and the monomer $M_2$ are St and CHMI, respectively, the monomer reactivity ratios $r_1$ and $r_2$ are 0.13 and 0.0053, which are extremely small (see, for example, H. Aida, I. Takase, M. Kobayashi, Research Report of the Department of Engineering, University of Fukui, 31, 1, pp. 43-50 (1985), T. Oishi, M. Fujimoto, and Y. Haruta, Kobunshi Ronbunshu, 48(3), pp. 123-128 (1991)). Thus, we analyzed the copolymerization composition of the monomer $M_1$ and the monomer $M_2$ that were St and EMI, respectively.

TABLE 4

| $M_1$ | $M_2$ | $r_1$ | $r_2$ |
|---|---|---|---|
| St | EMI | 0.05 | 0.01 |
| St | CHMI | 0.13 | 0.053 |

Figure 5:
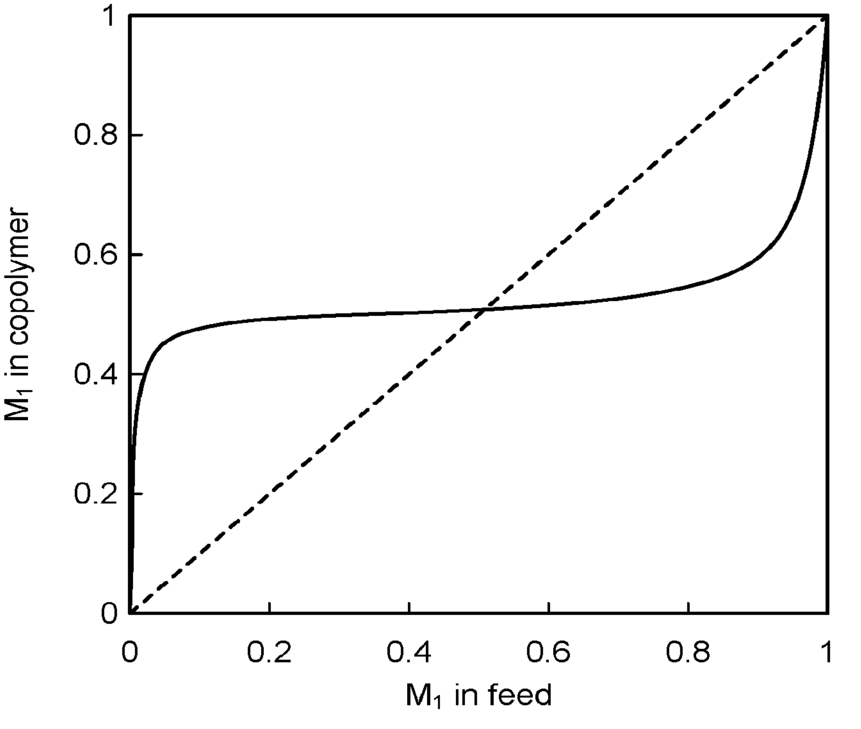
FIG. 5 is a graph illustrating the ratio of a monomer $M_1$ in an alternating polymer versus the ratio of the monomer $M_1$ in blended monomers.

FIG. 5 is a graph illustrating the ratio of $M_1$ (St) in the polymer versus the ratio of $M_1$ in the blended monomers. On the horizontal axis, for example, 0 indicates that all of the blended monomers are $M_2$ (EMI) and 1 indicates that all of the blended monomers are $M_1$. The vertical axis represents the ratio of $M_1$ in the polymer that is formed instantaneously in the case of the ratio on the horizontal axis.

As illustrated in FIG. 5, the ratio of $M_1$ in the polymerization sharply reaches 0.5 as the ratio of $M_1$ increases only slightly from 0. Then, 0.5 is maintained until the ratio of $M_1$ comes much closer to 1. This indicates that the alternating copolymer made of $M_1$ and $M_2$ can be very easily formed. It was observed that such a tendency did not change significantly even when $r_1$ and $r_2$ were changed within the range of about 0.01 to 0.1.

Figure 6:
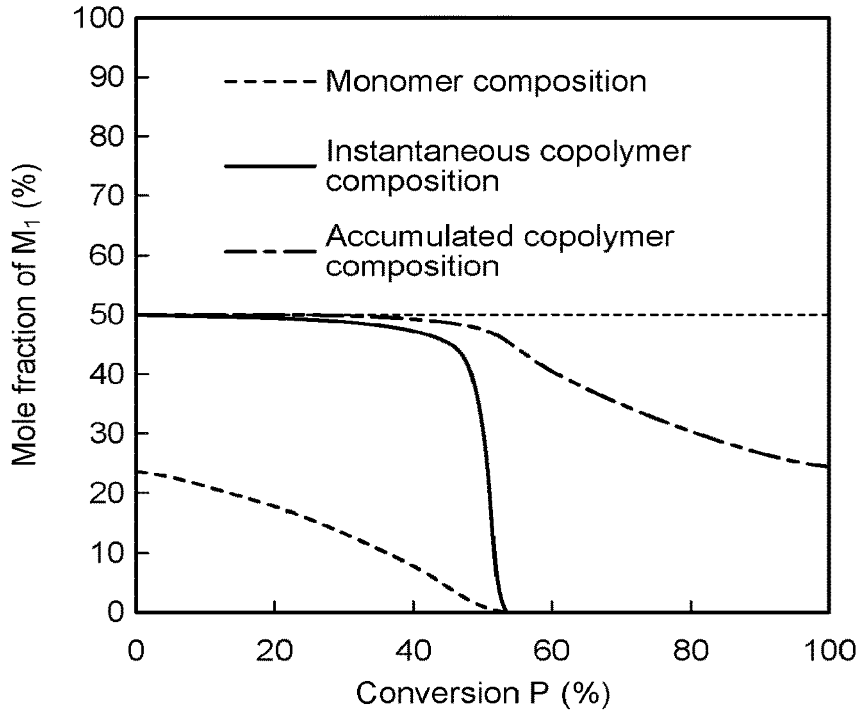
FIG. 6 is a graph illustrating the mole fraction of the monomer $M_1$ versus the conversion.

FIG. 6 is a graph illustrating the mole fraction of $M_1$ versus the conversion when $M_1$ and $M_2$ are St and EMI, respectively. The conversion is the ratio of polymerized monomers to all monomers blended for preparing the polymer material.

In FIG. 6, "Monomer composition" represents the mole fraction of monomers of $M_1$, which is about 23% when the conversion P is 0%, but becomes 0% when the conversion rate P is about 50%. This means that all the monomers of $M_1$ have been polymerized. "Instantaneous copolymer composition" represents the mole fraction of polymers that are formed instantaneously at the corresponding conversion P, which is 50% even when the conversion P is 0%. This means that alternating copolymers are formed from the early stage after the start of polymerization. This mole fraction drops sharply to 0% when the conversion P is around 50%. This is because the ratio of monomers of $M_1$ for forming the alternating copolymers becomes 0%. "Accumulated copolymer composition" is the cumulative value of polymers containing $M_1$. This value is about 50% when the conversion P is 0% to around 50% because alternating copolymers are formed. However, when the conversion P is 50% or more, formation of homopolymers of $M_2$ proceeds, and thus the relative ratio of polymers (almost alternating copolymers) containing $M_1$ decreases accordingly. Because calculated values are plotted in FIG. 6, the conversion P is displayed up to 100°. However, in reality, as the polymerization reaction proceeds, it becomes difficult for the monomers to move in the polymers, and thus the polymerization reaction slows down when a certain conversion has been reached. It was observed that such a tendency did not change significantly even when $r_1$ and $r_2$ were changed within the range of about 0.01 to 0.1.

Here, based on P(St/EMI=35/65 (mol %)) in the optical polymer material and the optical film prepared, it is suggested that the ratio of conversion to polymer is about 80%.

Figure 7:
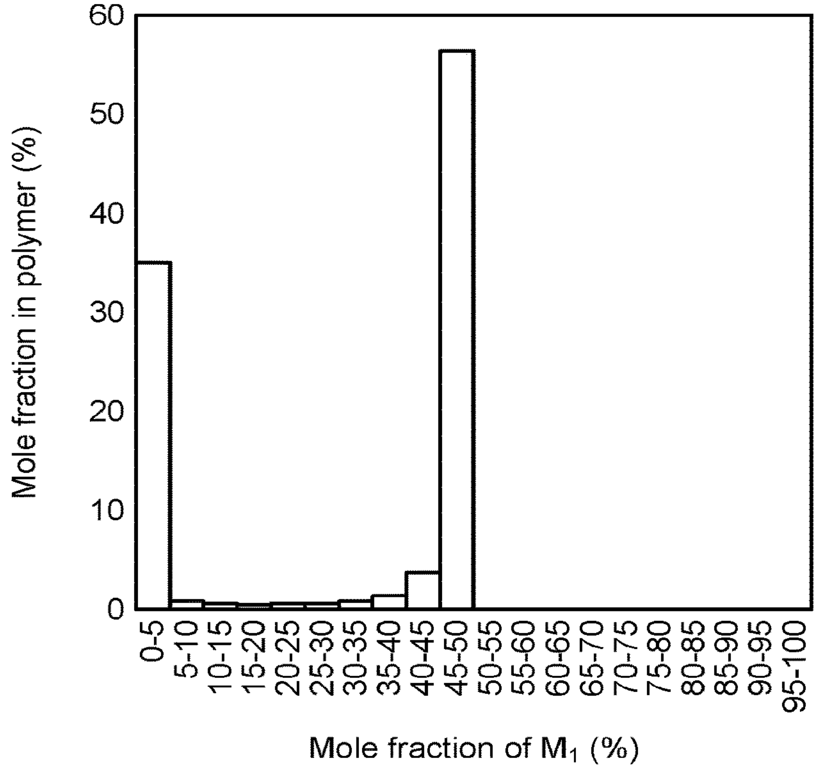
FIG. 7 is a histogram illustrating the composition distribution when the ratio of conversion is 80%.

FIG. 7 is a histogram illustrating the composition distribution when the ratio of conversion is 80%. FIG. 7 demonstrates the following: Polymers that are very highly alternating copolymerizable and contain $M_1$ at 40 to 50° (St) account for about 55° of the total polymers; polymers that contain $M_1$ at 5° or less and are almost homopolymers of $M_2$ (EMI) account for about 35% of the total polymers; and the remaining 10% are polymers with compositions in between. It is suggested that, among these, the polymers containing $M_1$ at 40 to 50% are alternating copolymers of $M_1$ and $M_2$, i.e., P(St-alt-EMI) because $r_1, r_2 \ll 1$.

(Photoelastic Coefficient of Various P(St/XMI))

Figure 8:
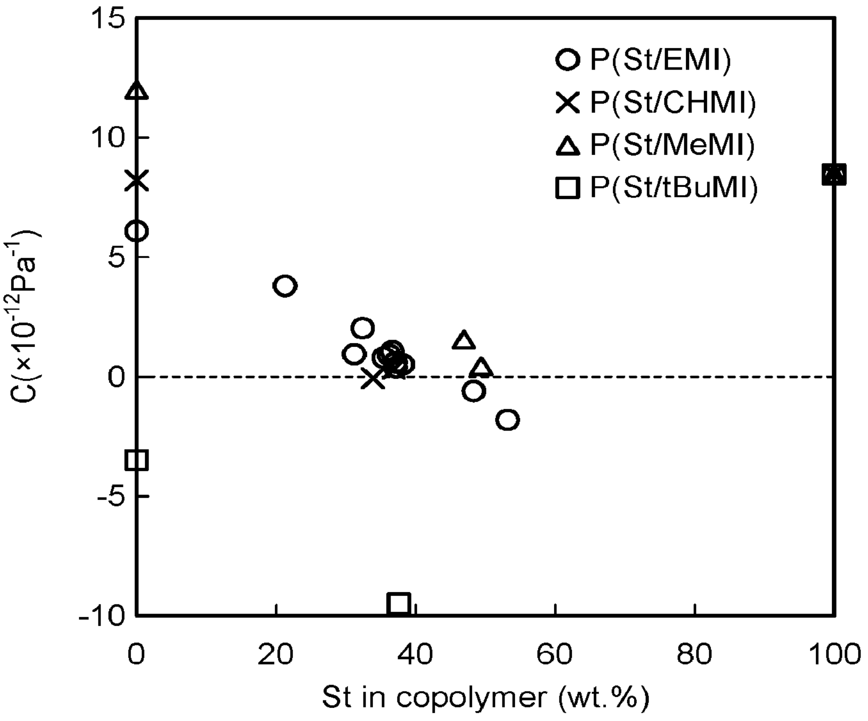
FIG. 8 is a graph illustrating the photoelastic coefficient versus the mass ratio of styrene in optical polymer materials with different maleimide derivatives.

The following describes results of measurement of the photoelastic coefficient of P(St/XMI) with different maleimide derivatives. FIG. 8 is a graph illustrating the photoelastic coefficient of P(St/XMI) when XMI is EMI, CHMI, MeMI, and tBuMI. In all cases, the mass ratio of St was calculated from the refractive index measured at a wavelength of 594 nm, assuming that the refractive index changes linearly with the mass ratio. When the horizontal axis is 100 wt. %, the data points of four types of P(St/XMI) overlap each other substantially. In all cases, nonlinear characteristics were observed in which the photoelastic coefficient decreased with an increase in mass ratio of St and increased with a further increase in mass ratio of St. The cause of such nonlinearity is not necessarily clear, but is expected to be interaction between the skeleton of the maleimide derivative and the benzene ring of the St derivative.

(Haze Value of Polymer Blended with P(St/EMI) and PEMI)

Subsequently, P(St/EMI=30/70 (wt. %)) and a homopolymer of EMI (PEMI) were mixed by the same mass, dissolved in methylene chloride, and spread on a peeling PET film in the same manner as described above to prepare a blended polymer in a film form. The glass transition temperature and the haze value of this blended polymer were then measured. As a result, the haze value was 1.26° despite being a blended polymer, and was equivalent to 1.25% being the haze value of polymethylmethacrylate (PMMA).

The glass transition temperature of the blended polymer was 220° C. This was a value equivalent to 221° C. that was the average of 185° C. being the glass transition temperature of P(St/EMI=30/70 (wt. %)) and 257° C. being the glass transition temperature of PEMI. In addition, there was a single endothermic peak in the glass transition of the blended polymer. This suggests that the blended polymers are highly compatible. The low haze value also suggests high compatibility.

When P(St/EMI)-based polymers were prepared, it was observed that a large amount of St caused cloudiness in some cases. In view of this, to lower the haze value, it is preferable to blend more monomers of maleimide derivatives (or materials for forming maleimide derivatives) than monomers of styrene derivatives (or materials for forming styrene derivatives) during manufacturing of the optical polymer material. Alternatively, a polymer blend method may be used for preparation thereof.

Another Embodiment

In order to modify the optical polymer material of the above embodiment, the inventors conducted a study of containing a monomer of a methacrylic acid derivative, in materials for forming the polymer, as a modified organic compound in addition to the styrene derivative and the maleimide derivative. Although the styrene derivative and the maleimide derivative have, for example, photoelastic coefficients that are positive, the methacrylic acid derivative has a physical property related to mechanical strength such as glass transition temperature that is different from those of the monomer of the styrene derivative and the monomer of the maleimide derivative, and also has, for example, a photoelastic coefficient that takes on a negative value.

As a result, the inventors have found an optical polymer material containing the monomer of the styrene derivative, the monomer of the maleimide derivative, and a monomer of a methacrylic acid derivative, and having a nonlinear property in which the photoelastic coefficient thereof decreases to a second value as the composition ratio of the styrene derivative increases in relation to the monomer of the styrene derivative and the monomer of the maleimide derivative, and the photoelastic coefficient rises above the second value as the composition ratio of the styrene derivative further increases. The composition ratio of the styrene derivative is within a predetermined range. Within this composition ratio range, the absolute value of the photoelastic coefficient is equal to or smaller than a third absolute value. The absolute value of the intrinsic birefringence thereof is equal to or smaller than a fourth absolute value. The third absolute value is, for example, $50\times10^{-12}$ $Pa^{-1}$, and the fourth absolute value is, for example, $20\times10^{-3}$. Furthermore, the inventors have conceived that it is possible to produce an optical polymer material having a simple ternary composition and ease of design and also having an extremely desirable low birefringence property and a modified property for mechanical strength by: in the above-described optical polymer material, setting the composition ratio of the styrene derivative and the composition ratio of the maleimide derivative such that, in a two-dimensional birefringence map defined by the photoelastic coefficient and the intrinsic birefringence, a coordinate point represented by a first photoelastic coefficient and a first intrinsic birefringence, which are determined by the composition ratio of the styrene derivative and the composition ratio of the maleimide derivative, and a coordinate point represented by the second photoelastic coefficient and the second intrinsic birefringence of the methacrylic acid derivative are located with the origin point interposed therebetween; and setting the composition ratio of the methacrylic acid derivative such that the first photoelastic coefficient and the first intrinsic birefringence are canceled out.

Furthermore, the inventors have conceived that it is possible to produce an optical polymer material having a simple ternary composition and ease of design and also having an extremely desirable low birefringence property and a modified property for mechanical strength by: in an optical polymer material containing a polymer made of the monomer of the styrene derivative, the monomer of the maleimide derivative, and the monomer of the methacrylic acid derivative, setting the composition ratios of any two of the styrene derivative, the maleimide derivative, and the methacrylic acid derivative such that, in a two-dimensional birefringence map defined by the photoelastic coefficient and the intrinsic birefringence, a coordinate point represented by the first photoelastic coefficient and the first intrinsic birefringence determined by the two composition ratios and a coordinate point represented by the second photoelastic coefficient and the second intrinsic birefringence of the other of the styrene derivative, the maleimide derivative, and the methacrylic acid derivative are located with the origin point interposed therebetween; and setting the composition rate of the other such that the first photoelastic coefficient and the first intrinsic birefringence are canceled out.

In the above-described study, the inventors first prepared copolymers using St and the methacrylic acid derivative as a preliminary study. Methyl methacrylate (MMA) was used as the methacrylic acid derivative. To begin with, MMA manufactured by Wako Pure Chemical Industries, Ltd. was prepared as a reagent. MMA was purified by vacuum distillation. Methanol and methylene chloride manufactured by Wako Pure Chemical Industries, Ltd. were also prepared as solvents.

The polymerization was then performed by a step similar to that for the alternating copolymers described above, however, under appropriately optimized conditions. A bulk obtained by cutting off both ends of a cylindrical bulk of each optical polymer material prepared by this step was further purified by a step similar to that for the alternating copolymers described above, however, under appropriately optimized conditions.

The glass transition temperature of the purified polymer obtained by the above-described steps was measured with the DSC-60 (DSC).

Furthermore, the purified polymer was formed into a thin film by a step similar to that for the alternating copolymers described above, however, under appropriately optimized conditions.

The photoelastic coefficient of the prepared polymer film was measured with the ABR-EX.

Subsequently, each prepared polymer film was uniaxially thermally stretched with IMC-11A9 that is a film biaxial stretching device manufactured by Imoto machinery Co., Ltd. This stretched film was then allowed to stand for 24 hours or more to reduce the internal stress, and the degree of orientation thereof was evaluated by the infrared dichroism method on the basis of absorbance in the infrared region measured with the Varian 7000e. The retardation of the stretched film was measured with the ABR-10A. The intrinsic birefringence was then calculated from the retardation, the degree of orientation, and the film thickness. For some of the polymer films, the refractive index was measured to estimate the copolymerization composition ratio.

Figure 9:
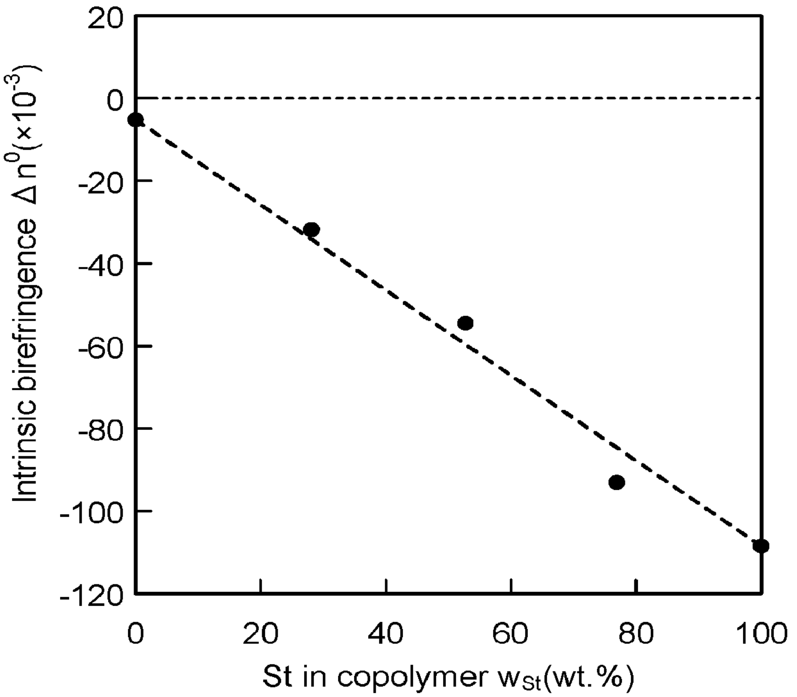
FIG. 9 is a graph illustrating the intrinsic birefringence versus the mass ratio of styrene in an optical polymer film containing P(St/MMA).

FIG. 9 is a graph illustrating the intrinsic birefringence versus the mass ratio of styrene in the optical polymer film containing P(St/MMA) at 25° C. The vertical axis represents the intrinsic birefringence $\Delta n^0$. The horizontal axis represents the composition ratio of St in the optical polymer film as a percentage by mass (wt. %). The mass ratio of St is calculated from the refractive index measured at a wavelength of 594 nm, assuming that the refractive index changes linearly with the mass ratio. As illustrated in FIG. 9, it was observed that the intrinsic refractive index changed linearly with the mass ratio of St.

Figure 10:
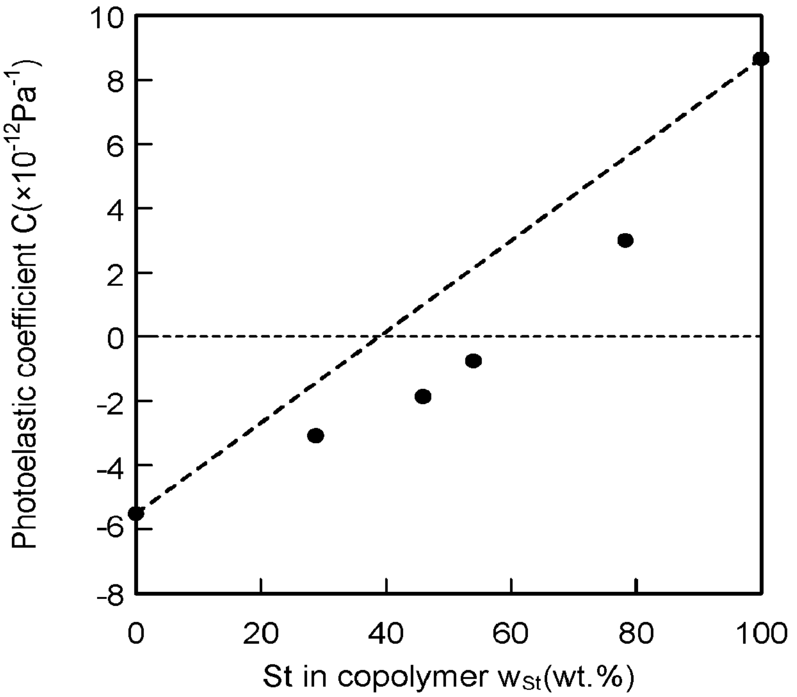
FIG. 10 is a graph illustrating the photoelastic coefficient versus the mass ratio of styrene in the optical polymer containing P(St/MMA).

FIG. 10 is a graph illustrating the photoelastic coefficient versus the mass ratio of styrene in the optical polymer containing P(St/MMA). The horizontal axis represents the composition ratio of St in the optical polymer film as a percentage by mass (wt. %). The vertical axis represents the photoelastic coefficient C. The mass ratio of St is calculated from the refractive index measured at a wavelength of 594 nm, assuming that the refractive index changes linearly with the mass ratio.

As illustrated in FIG. 10, it was observed that the photoelastic coefficient, the change of which with respect to the mass ratio of St deviated significantly from the linear one, changed in a downward convex shape. It was also observed that, the photoelastic coefficient of optical polymers when the mass ratio of St was 0%, i.e., MMA was contained at 100%, took on a negative value.

The above results of P(St/MMA) and P(St/EMI) were used to create a two-dimensional birefringence map of the ternary optical polymer containing P(St/EMI/MMA). The two-dimensional birefringence map is a map obtained by drawing lines each connecting any two of coordinate points of the intrinsic birefringence and the photoelastic coefficient of the respective homopolymers of St, EMI, and MMA, on the two-dimensional coordinate axes defined by the intrinsic birefringence and the photoelastic coefficient.

Figure 11:
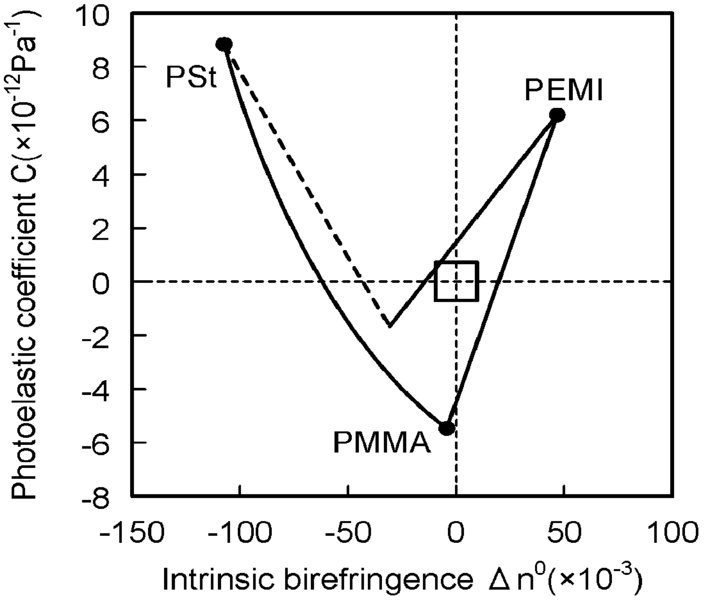
FIG. 11 is a graph illustrating a two-dimensional birefringence map of P(St/EMI/MMA).

FIG. 11 is a graph illustrating the two-dimensional birefringence map of P(St/EMI/MMA). An unmeasured section is indicated by a dashed line. As described above, in binary optical polymers containing St, because the change of the photoelastic coefficient with respect to the composition ratio is nonlinear, the line segment also has a nonlinear shape. Herein, for example, PSt indicates a point that represents the characteristics of the homopolymer of St. The same applies to PEMI and PMMA. The square in the graph indicates an area very close to the origin point.

By using this two-dimensional birefringence map, for example, as in the following example, optical polymers with composition ratios at which the intrinsic birefringence and the photoelastic coefficient are low can be designed. Specifically, to begin with, the composition ratio of P(St/EMMI) is set such that a coordinate point represented by the photoelastic coefficient and the intrinsic birefringence (the first photoelastic coefficient and the first intrinsic birefringence), which are determined by the composition ratio of St and the composition ratio of EMI, and a coordinate point represented by the photoelastic coefficient and the intrinsic birefringence (the second photoelastic coefficient and the second intrinsic birefringence) of MMA are located with the origin point interposed therebetween. Subsequently, the composition ratio of the methacrylic acid derivative is set such that the first photoelastic coefficient and the first intrinsic birefringence are canceled out with the second photoelastic coefficient and the second intrinsic birefringence.

The expression "the coordinate point represented by the first photoelastic coefficient and the first intrinsic birefringence and the coordinate point represented by the second photoelastic coefficient and the second intrinsic birefringence are located with the origin point interposed therebetween" includes a case in which the three points are aligned in a straight line, but they do not necessarily have to be aligned in a straight line, and includes a case in which, for example, a straight line connecting the two coordinate points pass near the origin point. The expression "the first photoelastic coefficient and the first intrinsic birefringence are canceled out with the second photoelastic coefficient and the second intrinsic birefringence" includes completely canceled cases in which the sum of the second photoelastic coefficient and the first photoelastic coefficient is zero and the sum of the second intrinsic birefringence and the first photoelastic coefficient is zero, but also includes not-completely canceled cases in which the sum of at least one of them is a value close to zero. This makes it possible to produce an optical polymer material the absolute value of the photoelastic coefficient of which is $50\times10^{-12}$ $Pa^{-1}$ or less and the absolute value of the intrinsic birefringence of which is $20\times10^{-3}$ or less.

(Preparation of Ternary Optical Polymers)

By using the two-dimensional birefringence map of P(St/EMI/MMA) in FIG. 11, the monomer amounts and composition ratios given in Table 5 were set to prepare a ternary optical polymer film. St (wt. %), EMI (wt. %), and MMA (wt. %) are mass ratios at the time of preparation.

TABLE 5

| Monomer | St | EMI | MMA |
|---|---|---|---|
| Prepared amount | 0.85 g | 3.15 g | 1 g |
| Prepared composition ratio | 17 wt. % (18.8 mol. %) | 63 wt. % (58.1 mol. %) | 20 wt. % (23.1 mol. %) |

Specifically, the monomers given in Table 5 were prepared and polymerized by a step similar to that for the alternating copolymers described above, however, under appropriately optimized conditions. A bulk obtained by cutting off both ends of a cylindrical bulk of each optical polymer material prepared by this step was further purified by a step similar to that for the alternating copolymers described above, however, under appropriately optimized conditions. For example, drying under reduced pressure in a reduced-pressure dryer was performed at 90° C. for 24 hours.

The glass transition temperature of the purified polymer obtained by the above-described steps was measured with the DSC-60 (DSC).

Furthermore, the purified polymer was formed into a thin film by a step similar to that for the alternating copolymers described above, however, under appropriately optimized conditions.

The photoelastic coefficient of the prepared polymer film was measured with the ABR-EX.

Subsequently, each prepared polymer film was uniaxially thermally stretched with IMC-11A9 that is a film biaxial stretching device manufactured by Imoto machinery Co., Ltd. This stretched film was then allowed to stand for 24 hours or more to reduce the internal stress, and the degree of orientation thereof was evaluated by the infrared dichroism method on the basis of absorbance in the infrared region measured with the Varian 7000e. The retardation of the stretched film was measured with the ABR-10A. The intrinsic birefringence was then calculated from the retardation, the degree of orientation, and the film thickness. For some of the polymer films, the refractive index was measured to estimate the copolymerization composition ratio.

An example of the properties of the optical polymer material and the optical film prepared is given in Table 6. As given in Table 6, a high glass transition temperature of 156° C. was obtained with St at 17 wt. %, EMI at 63 wt. %, and MMA at 20 wt. %, and thus high heat resistance was confirmed. The optical polymer material and the optical film were modified such that the glass transition temperature thereof became lower than 193.9° C. given in Table 2 for the binary ones that did not contain MMA. This temperature of 156° C. is higher than the glass transition temperature of acrylic resin, and is equivalent to 150° C. that is the glass transition temperature of polycarbonate. Thus, this optical polymer material and the optical film have high heat resistance and can be easily injection molded. The intrinsic birefringence $\Delta n^0$ was $0.10\times10^{-3}$ at 25° C., the temperature coefficient $d\Delta n^0/dT$ was $1.21\times10^{-5}$° $C.^{-1}$, and the photoelastic coefficient C was $-0.24\times10^{-12}$ $Pa^{-1}$, all of which were extremely low values close to zero, and thus preferable low birefringence properties were confirmed.

TABLE 6

| $\Delta n^0$ ($\times10^{-3}$) | C ($\times10^{-12}$ $Pa^{-1}$) | $d\Delta n^0/dT$ ($\times10^{-5}$° $C.^{-1}$) | Tg (° C.) |
|---|---|---|---|
| 0.10 | −0.24 | 1.21 | 156 |

Furthermore, a two-dimensional birefringence map of P(St/CHMI/MMA) as a ternary optical polymer using N-cyclohexylmaleimide (CHMI) as a maleimide derivative was created.

Figure 12:
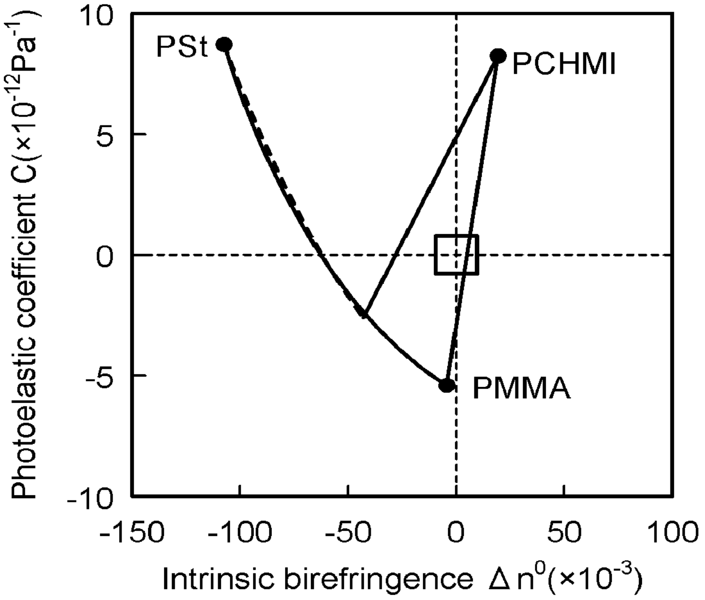
FIG. 12 is a graph illustrating a two-dimensional birefringence map of P(St/CHMI/MMA).

FIG. 12 is a graph illustrating the two-dimensional birefringence map of P(St/CHMI/MMA). An unmeasured section is indicated by a dashed line. The square in the graph indicates an area very close to the origin point. Similarly to FIG. 11, in binary optical polymers containing St, because the change of the photoelastic coefficient with respect to the composition ratio is nonlinear, the line segment also has a nonlinear shape.

By using this two-dimensional birefringence map, for example, as in the following example, optical polymers with composition ratios at which the intrinsic birefringence and the photoelastic coefficient are low can be designed. Specifically, to begin with, the composition ratio of P(St/CHMI) is set such that a coordinate point represented by the photoelastic coefficient and the intrinsic birefringence (the first photoelastic coefficient and the first intrinsic birefringence), which are determined by the composition ratio of St and the composition ratio of CHMI, and a coordinate point represented by the photoelastic coefficient and the intrinsic birefringence (the second photoelastic coefficient and the second intrinsic birefringence) of MMA are located with the origin point interposed therebetween. Subsequently, the composition ratio of the methacrylic acid derivative is set such that the first photoelastic coefficient and the first intrinsic birefringence are canceled out with the second photoelastic coefficient and the second intrinsic birefringence. This makes it possible to produce an optical polymer material the absolute value of the photoelastic coefficient of which is $50\times10^{-12}$ $Pa^{-1}$ or less and the absolute value of the intrinsic birefringence of which is $20\times10^{-3}$ or less.

By using the two-dimensional birefringence map of P(St/CHMI/MMA) in FIG. 12, the monomer amounts and composition ratios given in Table 7 were set to prepare a ternary optical polymer film. St)(wt. %, CHMI)(wt. %, and MMA)(wt. % are mass ratios at the time of preparation.

TABLE 7

| Monomer | St | CHMI | MMA |
|---|---|---|---|
| Prepared amount | 0.30 g | 2.00 g | 2.70 g |
| Prepared composition ratio | 6 wt. % (7 mol. %) | 40 wt. % (27.2 mol. %) | 54 wt. % (65.8 mol. %) |

Specifically, the monomers given in Table 7 were prepared and polymerized by a step similar to that for P(St/EMI/MMA) described above, however, under appropriately optimized conditions. A bulk obtained by cutting off both ends of a cylindrical bulk of each optical polymer material prepared by this step was further purified by a step similar to that for P(St/EMI/MMA) described above, however, under appropriately optimized conditions.

The glass transition temperature of the purified polymer obtained by the above-described steps was measured with the DSC-60 (DSC).

Furthermore, the purified polymer was formed into a thin film by a step similar to that for P(St/EMI/MMA) described above, however, under appropriately optimized conditions.

The photoelastic coefficient of the prepared polymer film was measured with the ABR-EX.

Subsequently, each polymer film was uniaxially thermally stretched with the IMC-11A9. This stretched film was then allowed to stand for 24 hours or more to reduce the internal stress, and the degree of orientation thereof was evaluated by the infrared dichroism method on the basis of absorbance in the infrared region measured with the Varian 7000e. The retardation of the stretched film was measured with the ABR-10A. The intrinsic birefringence was then calculated from the retardation, the degree of orientation, and the film thickness. For some of the polymer films, the refractive index was measured to estimate the copolymerization composition ratio.

An example of the properties of the optical polymer material and the optical film prepared is given in Table 8. As given in Table 8, a high glass transition temperature of 161° C. was obtained with St at 6 wt. %, CHMI at 40 wt. %, and MMA at 54 wt. %, and thus it was confirmed that the heat resistance was high and injection-molding could be easily performed. The intrinsic birefringence $\Delta n^0$ was $-5.23\times10^{-3}$ at 25° C., the photoelastic coefficient C was $-0.12\times10^{-12}$ $Pa^{-1}$, both of which were extremely low values close to zero, and thus preferable low birefringence properties were confirmed.

TABLE 8

| $\Delta n^0$ ($\times10^{-3}$) | C ($\times10^{-12}$ $Pa^{-1}$) | Tg |
|---|---|---|
| −5.23 | −0.12 | 161 |

Furthermore, a two-dimensional birefringence map of P(St/EMI/TCEMA) as a ternary optical polymer using 2,2,2-trichloroethyl methacrylate (TCEMA), which is a methacrylic acid derivative, as a modified organic compound was created.

Figure 13:
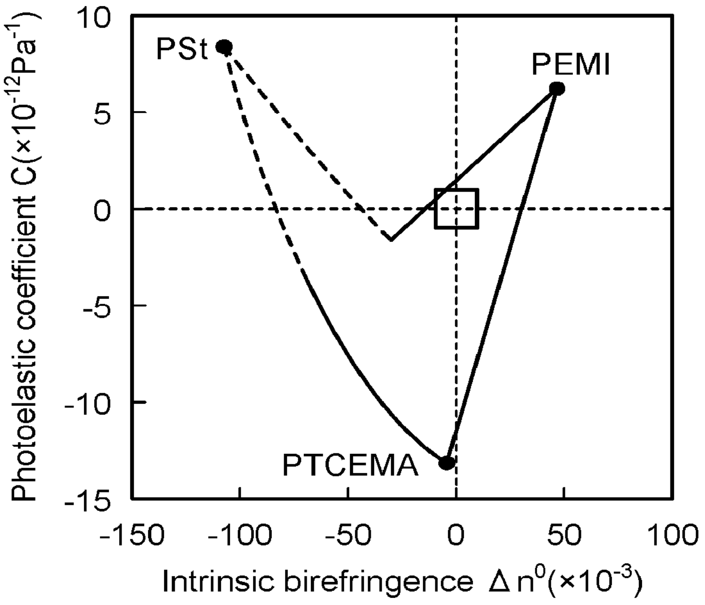
FIG. 13 is a graph illustrating a two-dimensional birefringence map of P(St/EMI/TCEMA).

FIG. 13 is a graph illustrating a two-dimensional birefringence map of P(St/EMI/TCEMA). Unmeasured sections are indicated by dashed lines. The square in the graph indicates an area very close to the origin point. Using this two-dimensional birefringence map, it is possible to produce an optical polymer material the absolute value of the photoelastic coefficient of which is $50\times10^{-12}$ $Pa^{-1}$ or less and the absolute value of the intrinsic birefringence of which is $20\times10^{-3}$ or less.

By using the two-dimensional birefringence map of P(St/EMI/TCEMA) in FIG. 13, the monomer amounts and composition ratios given in Table 9 were set to prepare a ternary optical polymer film. St (wt. %), EMI (wt. %), and TCEMA (wt. %) are mass ratios at the time of preparation.

TABLE 9

| Monomer | St | EMI | TCEMA |
| --- | --- | --- | --- |
| Prepared amount | 1.15 g | 3.45 g | 0.4 g |
| Prepared composition ratio | 23.0 wt. % (27.3 mol. %) | 69.0 wt. % (68.2 mol. %) | 8.0 wt. % (4.5 mol. %) |

An example of the properties of the optical polymer material and the optical film prepared is given in Table 10. As given in Table 10, a high glass transition temperature of 188° C. was obtained with St at 23 wt. %, EMI at 69 wt. %, and TCEMA at 8 wt. %, and thus high heat resistance was confirmed. The intrinsic birefringence $\Delta n^0$ was $-0.65\times10^{-3}$ at 25° C., the photoelastic coefficient C was $0.08\times10^{-12}$ $Pa^{-1}$, both of which were extremely low values close to zero, and thus preferable low birefringence properties were confirmed.

TABLE 10

| $\Delta n^0$ ($\times10^{-3}$) | C ($\times10^{-12}$ $Pa^{-1}$) | $T_g$ (° C.) |
| --- | --- | --- |
| −0.65 | 0.08 | 188 |

Furthermore, a two-dimensional birefringence map of P(St/EMI/tBuMI) as a ternary optical polymer using tBuMI, which is a maleimide derivative, as a modified organic compound was created.

Figure 14:
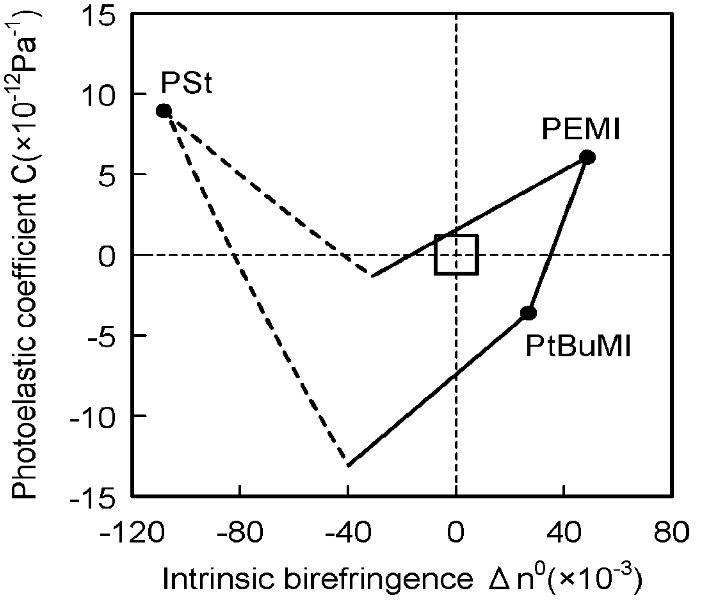
FIG. 14 is a graph illustrating a two-dimensional birefringence map of P(St/EMI/tBuMI).

FIG. 14 is a graph illustrating the two-dimensional birefringence map of P(St/EMI/tBuMI). Unmeasured sections are indicated by dashed lines. The square in the graph indicates an area very close to the origin point. Although tBuMI has a positive intrinsic birefringence, using this two-dimensional birefringence map, it is possible to produce an optical polymer material the absolute value of the photoelastic coefficient of which is $50\times10^{-12}$ $Pa^{-1}$ or less and the absolute value of the intrinsic birefringence of which is $20\times10^{-3}$ or less.

By using the two-dimensional birefringence map of P(St/EMI/tBuMI) in FIG. 14, the monomer amounts and composition ratios given in Table 11 were set to prepare a ternary optical polymer film. St (wt. %), EMI (wt. %), and tBuMI (wt. %) are mass ratios at the time of preparation.

TABLE 11

| Monomer | St | EMI | tBuMI |
| --- | --- | --- | --- |
| Prepared amount | 1.00 g | 2.50 g | 0.50 g |
| Prepared composition ratio | 25.0 wt. % (29 mol. %) | 62.5 wt. % (61 mol. %) | 12.5 wt. % (10 mol. %) |

An example of the properties of the optical polymer material and the optical film prepared is given in Table 12. As given in Table 12, a glass transition temperature of 197° C., which is higher than that of P(St/EMI), was obtained with St at 25.0 wt. %, EMI at 62.5 wt. %, and tBuMI at 12.5 wt. %, and thus high heat resistance was confirmed. The intrinsic birefringence $\Delta n^0$ was $3.68\times10^{-3}$ at 25° C., the photoelastic coefficient C was $0.27\times10^{-12}$ $Pa^{-1}$, both of which were extremely low values close to zero, and thus preferable low birefringence properties were confirmed.

TABLE 12

| $\Delta n^0$ ($\times10^{-3}$) | C ($\times10^{-12}$ $Pa^{-1}$) | $T_g$ (° C.) |
| --- | --- | --- |
| 3.68 | 0.27 | 197 |

As illustrated in the example of P(St/EMI/tBuMI), the modified organic compound is not limited to the methacrylic acid derivative, and the sign of the photoelastic coefficient thereof may be either positive or negative. In the modified organic compound, the physical property that is different from those of the monomer of the styrene derivative and the monomer of the maleimide derivative is not limited to the glass transition temperature, and may be other physical properties related to mechanical strength. In this case, an optical polymer material with more preferable physical properties related to mechanical strength can be obtained. The modified organic compound may also contain two or more different types of monomers.

The present invention is not limited to the above-described embodiments. Constituents into which the respective elements are combined as appropriate are also included in the present invention. Further effects and modifications can be easily derived by the skilled person. Thus, the broader aspects of the present invention are not limited to the above-described embodiments, and various changes may be made.

REFERENCE SIGNS LIST

10 liquid crystal display
1 backlight
2, 9 polarizer
3, 8 phase-difference film
4, 6 glass substrate with transparent electrode
5 liquid crystal layer
7 RGB color filter

The invention claimed is:

1. A low birefringence optical polymer material comprising an alternating copolymer comprising a monomer of a styrene derivative and a monomer of at least one maleimide derivative, wherein (a) the optical polymer material exhibits a nonlinear property in which a photoelastic coefficient of the optical polymer material decreases to a minimum value with an increase in composition ratio of the styrene derivative, and rises above the minimum value with a further increase in composition ratio of the styrene derivative, (b-1) an absolute value of the photoelastic coefficient is equal to or smaller than $2\times10^{-12}$ $Pa^{-1}$ within a predetermined range of the composition ratio, and (b-2) an absolute value of an intrinsic birefringence of the optical polymer material is equal to or smaller than $20\times10^{-3}$ within the predetermined range of the composition ratio, and (b-3) an absolute value of a temperature coefficient of the intrinsic birefringence is $2\times10^{-5°}$ $C.^{-1}$ or less, and (c) the composition ratio of the maleimide derivative is more than the composition ratio of the styrene derivative, and wherein the alternating copolymer comprises (i) from 7 mol % to 27 mol % of the styrene derivative, (ii) from 27 mol % to 68 mol % of the maleimide derivative and (iii) the remainder being at least one monomer of a modified organic compound having a physical property related to mechanical strength, the physical property being different from those of the monomer of the styrene derivative and the monomer of the maleimide derivative.

2. The low birefringence optical polymer material according to claim 1, wherein the styrene derivative is styrene and the maleimide derivative is ethylmaleimide.

3. A low birefringence optical polymer material comprising a polymer made of (i) a monomer of a styrene derivative, (ii) a monomer of at least a maleimide derivative, and (iii) a monomer of a modified organic compound having a physical property related to mechanical strength, the physical property being different from those of the monomer of the styrene derivative and the monomer of the at least one maleimide derivative, wherein (a) the optical polymer material exhibits a nonlinear property in which, in relation to the monomer of the styrene derivative and the monomer of the maleimide derivative, a photoelastic coefficient of the optical polymer material decreases to a minimum value with an increase in composition ratio of the styrene derivative, and rises above the minimum value with a further increase in composition ratio of the styrene derivative, and a composition ratio of the styrene derivative is within a predetermined range, (b-1) an absolute value of the photoelastic coefficient is equal to or smaller $2\times10^{-12}$ $Pa^{-1}$ value within the predetermined range of the composition ratio, (b-2) an absolute value of an intrinsic birefringence of the optical polymer material is equal to or smaller than $20\times10^{-3}$ within the predetermined range of the composition ratio, and (b-3) an absolute value of a temperature coefficient of the intrinsic birefringence is $2\times10^{-5°°}C.^{-1}$ or less, and wherein the polymer comprises (i) from 7 mol % to 27 mol % of the styrene derivative, (ii) from 27 mol % to 68 mol % of the maleimide derivative where the maleimide derivative content exceeds that of the styrene derivative and (iii) the remainder being the at least one monomer of a modified organic compound having a physical property related to mechanical strength, the physical property being different from those of the monomer of the styrene derivative and the monomer of the maleimide derivative.

4. The low birefringence optical polymer material according to claim 3, wherein in a two-dimensional birefringence map defined by the intrinsic birefringence and the photoelastic coefficient, the composition ratio of the styrene derivative and a composition ratio of the maleimide derivative are set such that a coordinate point represented by a first photoelastic coefficient and a first intrinsic birefringence that are determined by the composition ratio of the styrene derivative and the composition ratio of the maleimide derivative, and a coordinate point represented by a second photoelastic coefficient and a second intrinsic birefringence of the modified organic compound are located with an origin point interposed therebetween, and a composition ratio of the modified organic compound is set such that the first photoelastic coefficient and the first intrinsic birefringence are canceled out with the second photoelastic coefficient and the second intrinsic birefringence.

5. The low birefringence optical polymer material according to claim 4, wherein a glass transition temperature of the optical polymer material is higher than that of acrylic resin and lower than that in a case in which the modified organic compound is not contained, or is higher than that in a case in which the modified organic compound is not contained.

6. The low birefringence optical polymer material according to claim 3, wherein the styrene derivative is styrene, the maleimide derivative is ethylmaleimide or cyclohexylmaleimide, and the modified organic compound is a methacrylic acid derivative or t-butylmaleimide.

7. The low birefringence optical polymer material according to claim 6, wherein the predetermined range of the composition ratio of the styrene derivative is a range including 6%, 17%, 23%, or 25% in terms of mass ratio, and a range including 7%, 18.8% or 27% in terms of mole fraction.

8. The low birefringence optical polymer material according to claim 1, further comprising a homopolymer of the maleimide derivative.

9. An optical film comprising the low birefringence optical polymer material according to claim 1.

10. A display device comprising the optical film according to claim 9.

11. The low birefringence optical polymer material of claim 1 wherein the alternating copolymer comprises on a weight basis more maleimide derivative than styrene derivative such that the intrinsic birefringence is 20×10-3 or lower.

* * * * *